April 12, 1966 R. A. LOGBECK 3,245,340
MEAT PROCESSING MACHINE
Filed May 14, 1964 3 Sheets-Sheet 1

INVENTOR.
Ruben A. Logbeck
BY
Hovey, Schmidt, Johnson & Hovey
ATTORNEYS.

April 12, 1966  R. A. LOGBECK  3,245,340
MEAT PROCESSING MACHINE
Filed May 14, 1964  3 Sheets-Sheet 2
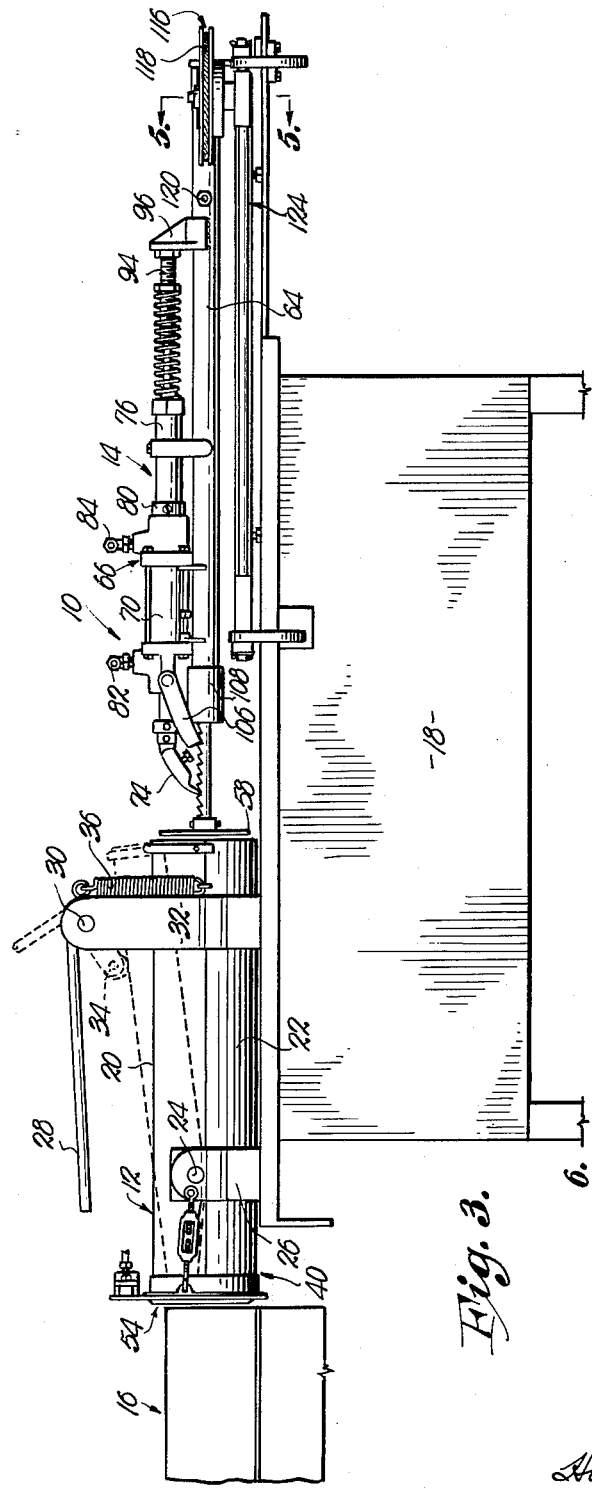
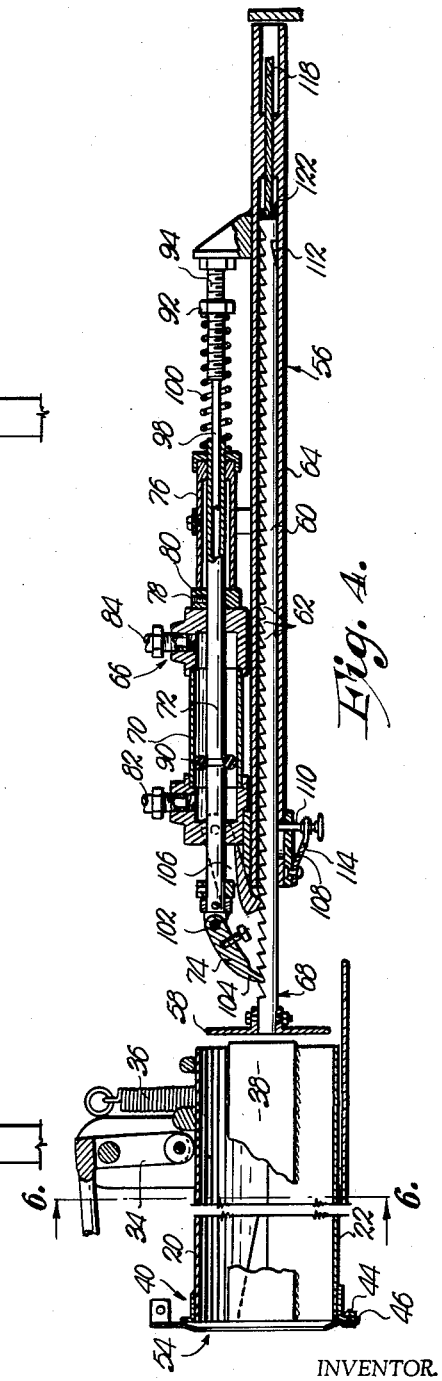
INVENTOR.
Ruben A. Logbeck
BY
Hovey, Schmidt, Johnson & Hovey
ATTORNEYS.

INVENTOR.
Ruben A. Logbeck
BY
Hovey, Schmidt, Johnson & Hovey
ATTORNEYS.

United States Patent Office 3,245,340
Patented Apr. 12, 1966

3,245,340
MEAT PROCESSING MACHINE
Ruben A. Logbeck, Rte. 5, Emporia, Kans.
Filed May 14, 1964, Ser. No. 367,390
11 Claims. (Cl. 100—233)

This invention relates to a machine for processing cuts of meat and, more particularly, to a machine for forming a cut or several cuts of meat into what is known as a "rolled roast" by compressing the meat into a substantially cylindrical form as it is forced through a tube by a feeding assembly and tying the meat at predetermined intervals as it emerges from the compression tube.

It is well known that a rolled roast, being a relatively expensive form of meat, is desirably attractive in configuration and appearance and compact in nature. To this end, it is preferable that the cut of meat or several cuts of meat in combination which cooperate to make up the rolled roast, be tightly tied together in cylindrical form, whereby the finished roast may present an attractive appearance in the meat display case and may be efficiently prepared by the ultimate user thereof. In the past, it has been the custom to hand-tie cuts of meat to form them into a rolled roast and to form the meat by hand methods, this being very undesirable inasmuch as the manual dexterity of the roast former is not sufficient to form the roast tightly and at the same time tie it into a finished product having the requisite firmness.

It is, therefore, the primary object of this invention to provide, in a meat-processing machine, apparatus for automatically forming a rolled roast by utilizing a compression tube, within which the cut or cuts of meat are placed; a feeding assembly including a piston and cylinder assembly, the piston plate being receivable within the compression tube; a tying mechanism positioned at the end of the tube opposite to that of the feeding assembly; fluid, such as air, under pressure for operating the entire machine whereby, upon actuation thereof, the machine performs in a predetermined cyclical fashion to move the meat through the tube in predetermined increments; and the meat being squeezed as it emerges from the end of the tube adjacent the tying mechanism, the tying mechanism placing a tie about the rolled roast as it emerges from the compression tube.

It is a yet further aim of this invention to provide, in a meat-processing machine, a compression tube which includes a pair of transversely arcuate sections, one of said sections being shiftable with respect to the other of said sections, there being a lever for shifting said movable section whereby to place the tube in an open or a closed condition, there being a gate at one end of the tube and means for reciprocating the pair of opposed segments which define the gate, whereby to cause the gate to squeeze the meat and reduce the diameter thereof as the meat passes from the tube and is tied by the tying mechanism.

Yet another object of this invention is to provide a feeding assembly for moving the meat through the compression tube, which feeding assembly includes a piston and cylinder assembly, the piston plate being receivable within the compression tube, the piston shaft being toothed; there being a driving unit for reciprocating said piston, the driving unit including a rod, the rod having a dog pivotally carried at one end thereof, which dog engages the teeth of the piston shaft whereby to reciprocate the shaft in one direction through the compression tube.

Another important accomplishment of this invention is to provide means for driving the components of the machine, the means comprising a source of fluid, such as air, under pressure and a piping system for selectively delivering the fluid under pressure to the feeding assembly, the gate on the compression tube, and the tying mechanism, whereby to sequentially operate the same in predetermined cycles.

Other objects of this invention include details of construction which will become apparent from the following specification and accompanying drawings, wherein:

FIG. 3 is a rear elevational view of the machine, parts being broken away;

FIG. 4 is a substantially central, longitudinal, sectional view of the compression tube and driving assembly;

Figure 1:
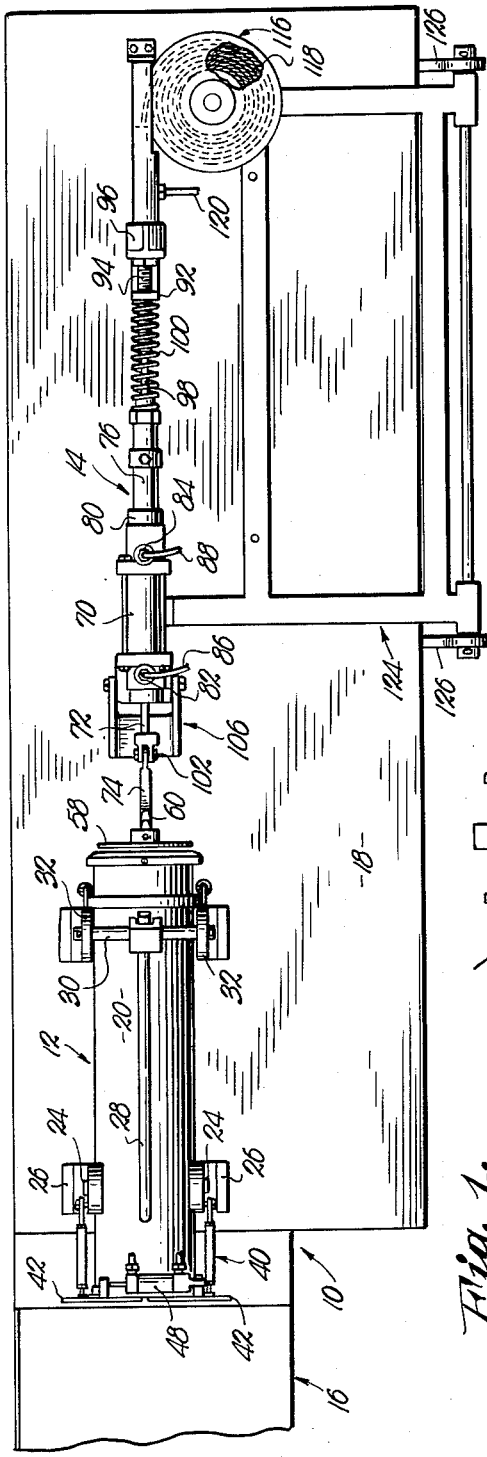
FIGURE 1 is a top plan view of the meat-processing machine, parts being broken away.

The meat-processing machine, broadly designated by the numeral 10, includes as its primary components, a compression tube 12; a feeding assembly 14; a tying mechanism 16; and a suitable support in the nature of a bench or table 18 which carries the compression tube 12 and feeder assembly 14 of machine 10, the tying mechanism 16 normally being individually supported.

The compression tube 12 includes a pair of transversely arcuate, elongated sections 20 and 22, each of said sections 20 and 22 preferably being semicylindrical, whereby said sections, when in a closed condition, as will be hereinafter described, define a cylindrical tube.

The normally uppermost section 20 is shiftable with respect to the fixed, normally lowermost section 22, said section 20 being pivotal about a pair of opposed stub shafts 24, which shafts are carried by blocks 26, which blocks 26 are in turn suitably secured to the top of support 18.

The section 20 is shifted by means of a lever 28, which lever is journaled on a shaft 30 extending between a pair of posts 32, there being a post 32 on each side of the compression tube 12. The lever 28 has a head 34, which head is in engagement with the outer surface of the normally uppermost, shiftable section 20. Said section 20 is urged in an upward direction, viewing the drawings, by a pair of coil springs 36, which springs 36 have their lowermost ends secured to the marginal edge of section 20 and their uppermost ends to the upper portion of the posts 32 whereby, when lever 28 is swung to the dotted line position shown in FIG. 3 and the head 34 thereof removed from tight engagement with section 20, said section is permitted to shift about shafts 24 to thereby swing to the dotted line position shown in FIG. 3 of the drawings.

When the sections 20 and 22 are in an open condition, which is achieved by following the step above described, the distance therebetween is spanned by a pair of opposed liners 38, which liners are substantially coextensive with tube 12, are secured to the lowermost section 22, and serve to line a substantial portion of the interior of the tube 12 when the tube is in its closed condition, said tube being closed by moving the lever 28 downwardly, whereby the head 34 is brought to bear upon the section 20 to thereby move the same into the full-line position of FIG. 3 and cause the same to cooperate with fixed section 22 to define the cylindrical tube 12 and compress the meat positioned therein.

One end 40 of the tube 12 has a pair of segments 42 shiftably carried with respect thereto, whereby, when said segments 42 are shifted toward one another, the inner, normally flattened edge of said segments engage the meat as it emerges from the tube 12 and reduce the over-all diameter thereof by exerting a squeezing pressure thereupon, said pressure being sufficient to compress the meat but yet not cut thereinto. Said segments 42 are identical and each is pivoted as at 44 to a flange 46 which circumscribes the tube 12, said points of pivotal attachment being at the underside of tube 12. A double-acting piston joins the normally upper ends of the segments 42, the piston being designated as 48 and being supplied with fluid under pressure by means of lines 50 and 52. The segments cooperate to define a gate 54 at the end 40 of tube 12.

Figure 7:
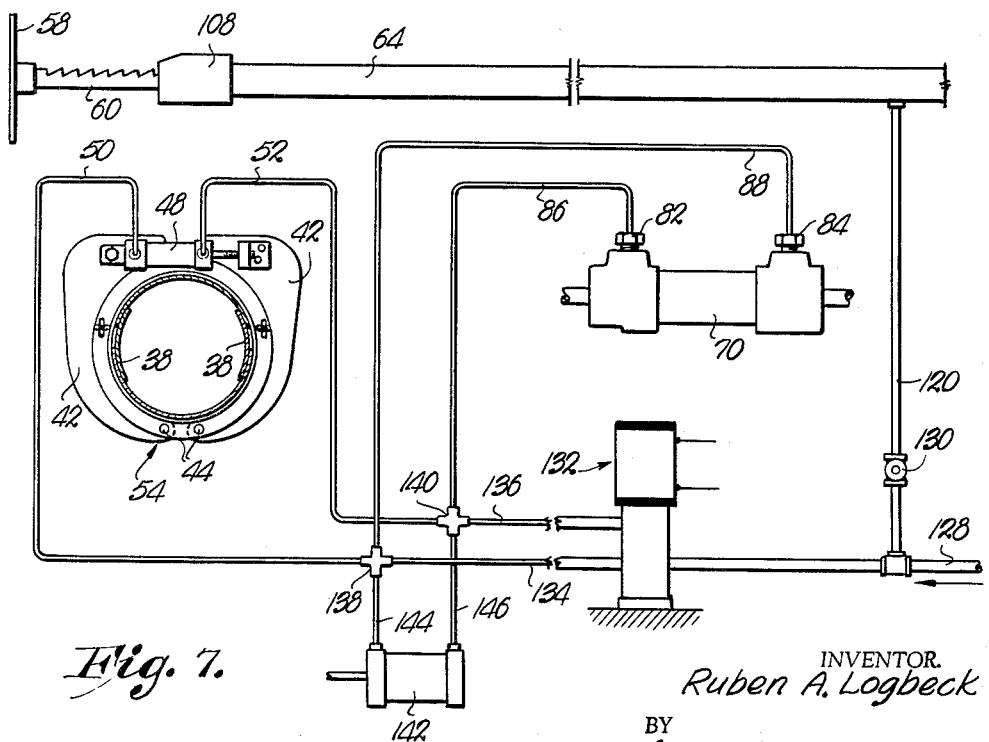
FIG. 7 is a schematic view of the system for delivering fluid under pressure to the various components of the machine.

As is perhaps most apparent from FIG. 7 of the drawings, the segments 42 can, upon shifting movement of piston 48 in one direction, be moved toward one another whereby to exert a squeeze upon a piece of meat which is emerging from end 40 of the tube 12 to reduce the diameter of the meat as far as is possible immediately prior to the tying thereof by mechanism 16.

In this regard, tying mechanism 16 is cooperatively associated with the machine 10 and may take the form of a commercially known tying machine, such as a Bunn tyer, conventionally used to place a length of cord about a cylindrical object, such as a rolled roast, and knot the cord in one operation of the tyer. The tying mechanism 16 is operatively coupled with the fluid delivery system of the machine 10 whereby it may be sequentially operated in cooperation with the other components of the machine. If desirable, and in applying a tyer to the particular machine herein described, a lubricant may be applied to the cord utilized by the machine, it having been found that a salad oil may be placed upon the cord as it is fed to the tyer and prior to its being wrapped around the roast which is being tied.

The feeding assembly 14 is intended to advance the meat through the compression tube 12 in predetermined increments, all to the end that the meat be thoroughly formed by the time it has moved through the tube and in order that it may be tied at the desired intervals by mechanism 16 as it emerges from end 40 of tube 12 and is squeezed between the segments 42 of gate 54.

The assembly 14 therefore includes a piston and cylinder assembly 56, the piston including a piston plate 58 and a piston shaft 60, which shaft 60 is provided with a plurality of teeth 62, the shaft 60 being reciprocably received within a cylinder 64.

Mounted upon cylinder 64 is a driving unit 66 which reciprocates the piston 68 of assembly 56 in one direction, this being to the left viewing the figures of the drawings. The driving unit 66 includes a sleeve 70 in the nature of a manifold, said sleeve receiving therewithin an elongated rod 72, which rod 72 pivotally carries a dog 74 at the end thereof proximal to the tube 12. The other end of rod 72 is received within a shiftable member 76 in the nature of a cylinder, said cylinder 76 being affixed to the rod 72 by a setscrew 78 extending through a ring 80.

Manifold 70 is affixed to the cylinder 64 by suitable brackets and has coupled therewith a pair of delivery couplings 82 and 84, said couplings being in communication with fluid lines 86 and 88 respectively. A suitable piston-like member in the nature of an O-ring, and designated as 90, surrounds rod 72 intermediate that portion thereof which is encased within the manifold 70 whereby said rod 72 may be reciprocated in either direction, depending upon the coupling through which fluid is delivered in the manifold 70. The ring 80 serves to limit the reciprocating movement of the rod 72 in one direction, this being to the left in viewing FIG. 4, for instance, and the movement of said rod 72 in the other direction, to the right viewing FIG. 4, is limited by an adjusting nut 92 which is threaded upon a shank 94 carried by a brace 96, which brace 96 is mounted atop the cylinder 64. A bar 98 extends from shank 94 and into a central opening formed in the rod 72, and a coil spring 100 surrounds a portion of shank 94 and bar 98, one end of the spring being in engagement with the nut 92 and the other end thereof being in engagement with an end of the number 76, said end being opposite to that adjacent the ring 80.

The dog 74 is pivotally coupled to the rod 72 by a pin 102 whereby the dog may freely swing to bring the tip 104 thereof into engagement with one of the teeth 62 which is formed on the shaft 60. A lay dog 106 is swingably carried by the driving unit 66 in a position overlying the cylinder 64 and that portion of shaft 60 immediately adjacent the open end of the cylinder 64. Disposed in surrounding relationship to said open end of the cylinder 64 is a collar 108 which carries a spring-biased pin 110, the pin 110 riding against the normally undersurface of shaft 60, viewing FIG. 4, until such time as it is urged into a notch 112 formed in shaft 60 by the spring 114 which carries said pin 110.

A spring-loaded pulley 116 is carried above support 18 and has a cable 118 wrapped thereabout, which cable extends into the closed end of cylinder 64 and is secured to the end of shaft 60 opposite to that which carries the plate 58. A fluid delivery line 120 is also in communication with the end of the cylinder 64 which receives the cable 118, said cable passing through a suitable flexible cup 122 which insures that fluid delivered through line 120 will exert a force on piston 68 whereby to urge the same to the left, viewing the figures of the drawings.

Figure 2:
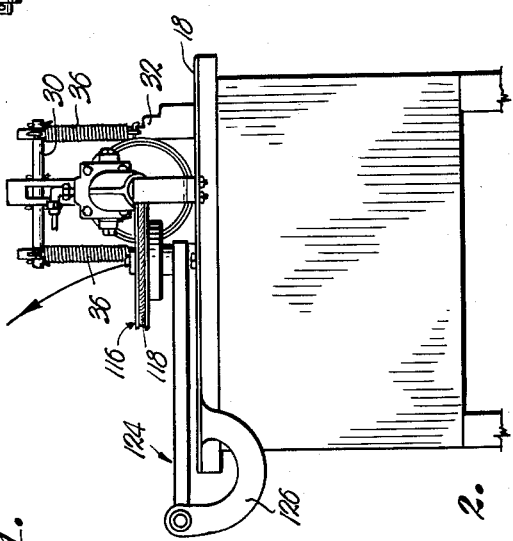
FIG. 2 is an end elevational view of the machine looking from the right-hand side of FIG. 1.
Figure 5:
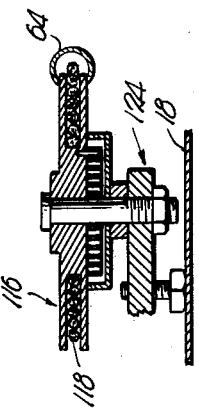
FIG. 5 is a sectional view taken on line 5—5 of FIG. 3.
Figure 6:
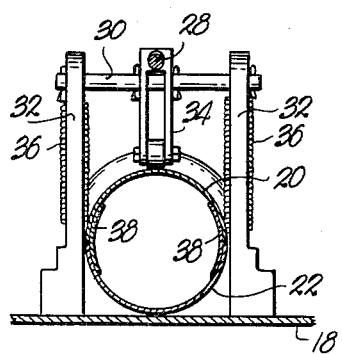
FIG. 6 is a sectional view taken on line 6—6 of FIG. 4.
Figure 8:
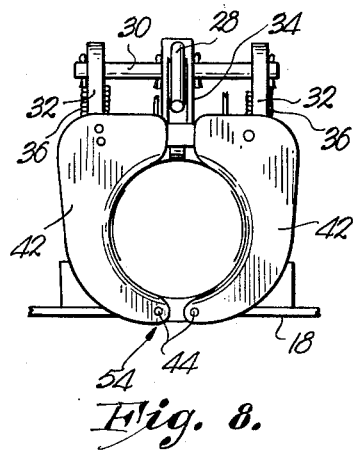
FIG. 8 is an elevational view of one end of the tube showing the gate closed.

The entire feeding assembly 14 is carried by a frame 124, which frame is best shown in FIG. 1 of the drawings, the same being swingably coupled to the support 18 by means of a pair of brackets 126 whereby said entire frame 124 and, therefore, the feeding assembly 14 and all of its related components, may be swung in the path of the arrow as shown in FIG. 2, thereby allowing free access to that end of the tube within which the meat is inserted prior to commencing operation of the machine 10.

The support 18 may be in the form of any suitable bench, table or the like, so long as it provides a relatively level uppermost surface upon which the feeding assembly 14, as carried by the frame 124, may be mounted and upon which the tube 12 and its related components may be suitable carried.

It is desirable that the piping components for delivering fluid under pressure to the various parts of the machine be retained, for the most part, in an enclosed compartment, preferably defined by the support 18.

The said fluid delivery assembly includes a main source of fluid under pressure (not shown), this preferably being air, said fluid being delivered to the machine through a main supply line 128, line 120 being coupled with main line 128 as best seen in FIG. 7, there being a valve 130 interposed in said line 120. A 3-position solenoid valve 132 is interposed in the main line 128, said valve being actuated in predetermined order by a suitable timing apparatus (not shown) which is electrically coupled thereto. Delivery lines 134 and 136 run from the valve 132 to a distributor 138 and 140 respectively, the distributor 138 being in communication with line 50, for segments 42 of gate 54; in communication with line 88 which extends to manifold 70; and in communication with a solenoid valve 142 which operates the tying mechanism 16 by means of a line 144. On the other hand, distributor 140 is in communication with line 52 which is associated with piston 48 which operates gate 54; line 86 which is associated with manifold 70; and a line 146 communicating with the valve 142 of the tying mechanism 16.

The operation of the machine is as follows:

Lever 28 is swung to a position whereby the sections 20 and 22 are shifted to an open condition, and the meat which is to be formed into the rolled roast by the machine 10, is inserted within the tube 12. To render this insertion as convenient as possible, it is desirable that the frame 124 be swung to its substantially vertical position whereby the feeding assembly 14 is moved to a position allowing free access to the end of the tube 12 into which the meat is initially inserted, this being the right-hand, viewing the drawings.

The frame 124 is then swung to the position illustrated in the drawings and the lever 28 is actuated whereby to shift section 20 downwardly and thereby place tube 12 in its closed condition thereby compressing, to the size of the tube 12, the meat inserted therein.

During this operation, the solenoid valve 132 is in a closed condition and it is allowed to remain closed while valve 130 is opened to deliver a charge of fluid under pressure through line 120 and into the cylinder 64, whereby to urge the piston 68 to the left, as the drawing is viewed, whereby to bring the piston plate 58 into engagement with one end of the meat which is contained within the compression tube 12. Once this has been accomplished, valve 130 is closed and the timing apparatus, which is coupled with solenoid valve 132, is actuated whereby to place the machine in automatic operation, the following various steps being performed in a predetermined sequence.

The two major steps are in the form of cycles controlled by solenoid valve 132, the first cycle occurring when fluid under pressure is permitted to pass through line 134 and into distributor 138, the fluid then moving through lines 50, 88 and 144. As the fluid moves through line 88, it enters manifold 70 through coupling 84 and urges rod 72 to the left, viewing the drawings, whereby to cause the dog 74 to engage a tooth 62 of shaft 60, thereby moving said shaft in one direction to the extent permitted by the ring 80, said ring moving into engagement with an end of the manifold 70 to serve as a stop when the predetermined increment has been accomplished.

Simultaneously with delivery of fluid through line 88 and into manifold 70, fluid passes through line 50 to the piston 48 to cause the gate 54 to open by shifting segments 42 in a direction away from one another. Also, at the same time, fluid passing through line 144 to solenoid valve 142, cocks the tying mechanism 16 and prepares the same to be actuated for a tying stroke. In this regard, the solenoid valve 142 is suitably coupled with the tying mechanism whereby, when the valve is actuated in the first sequence, the mechanism is prepared for use and when it is actuated during the second sequence or cycle, the tying mechanism is actually operated to cause a cord to be wrapped and tied about the meat emerging from the tube 12.

Once the first cycle has been accomplished, the timing apparatus automatically shifts the solenoid valve 132 to a position whereby to discontinue the flow of fluid through line 134 and allow fluid from main line 128 to move through line 136 and therefore, into distributor 140 and its associated delivery lines. As the fluid moves out of distributor 140, it passes through line 86 into manifold 70, through coupling 82, thereby causing rod 72 to shift in a right-hand direction, viewing the drawings, and moving the dog 74 along the upper edges of teeth 62 in a riding manner, whereby it may engage shaft 60 at a position rearwardly of its point of first engagement therewith whereby, upon accomplishment of the next occurrence of the cycle designated as number one, the shaft 60 will be caused to reciprocate to the left and thereby continue the movement of the meat through the tube 12. Fluid also leaves junction 140 and passes through line 52 reaching piston 48 to close the gate 54, thereby exerting the hereinabove described squeezing pressure upon the meat disposed therebetween.

Simultaneously, fluid moving through line 146 and into solenoid valve 142, causes actuation of the tying mechanism 16 whereby to cause the same to wrap a cord about the roast as it is squeezed between the segments 42 of the gate 54 at the end 40 of the tube 12.

Once the second cycle has been accomplished, the first and second cycles are alternately caused to occur by the timing mechanism until such time as the meat has moved entirely through the compression tube 12. It will be appreciated that the rod 72 and the dog 74 carried thereby, are alternately reciprocated whereby to urge shaft 60 to the left in predetermined increments, thus causing the meat to move through the tube 12 in such a manner that it may be tied at the desired intervals. In this regard, it will be appreciated that the driving unit 66 and its associated components, may be adjusted in such a manner that the tying intervals are those desired for the particular meat being processed.

Once the meat has been moved through the tube 12 by the operation of driving unit 66 and piston and cylinder assembly 56, the pin 110 is engaged by the notch 112 thereby causing collar 108 to move to the left and thereby swing lazy dog 106 upwardly, causing the same to engage a screw depending from dog 74 as the dog is being reciprocated upon the end of rod 72, all to the end that shaft 60 may be retracted under the urging of spring-loaded pulley 116 and the cable 118 carried thereby. Thus, it will be seen that once the meat has been moved through the tube, the driving unit 66 will be automatically disengaged from the shaft 60, thereby allowing the shaft 60 to be retracted by cable 118 and pulley 116 to its starting position. Once this has occurred, the entire sequence of operation can again be commenced.

Ths, it is seen that there is provided a meat-processing machine which automatically forms rolled roasts which are uniform in configuration and in the disposition of ties thereabout, all to the end that the meat may be rendered more saleable and attractive to the ultimate consumer.

Having thus described the invention, what is claimed as new and desired to be secured by Letters Patent is:

1. A meat-processing machine comprising:
   a tube consisting of a pair of transversely arcuate sections, one of said sections being shiftable with respect to the other section, whereby said tube may be positioned in an open or closed condition;
   a feeding assembly at one end of said tube for moving a piece of meat into and through said tube, said assembly including a piston plate having a diameter smaller than that of the tube when it is in a closed condition; and
   a gate at the other end of said tube, said gate including a pair of relatively thin, shiftable segments cooperating to selectively engage the meat as it is moved out of the other end of the tube when the tube is in a closed condition.

2. A meat-processing machine as set forth in claim 1, there being fluid-actuated means for shifting said segments.

3. A meat-processing machine as set forth in claim 1, said segments having innermost, flattened edges for engaging the meat as it is moved out of the other end of the tube, said segments exerting a squeezing action on the meat when it is so engaged whereby to reduce the diameter of the meat.

4. A meat-processing machine comprising:
   a tube consisting of a pair of transversely arcuate sections, one of said sections being shiftable with respect to the other section;
   a feeding assembly at one end of the tube for moving a piece of meat through said tube, said assembly including a piston and cylinder assembly, a driving unit for moving the piston in one direction and means for moving said piston in the other direction;
   a gate including a pair of relatively thin plates at the other end of said tube for squeezing the piece of meat as it is moved out of said other end of said tube by said feeding assembly; and
   a source of fluid under pressure for sequentially operating said machine in predetermined cycles, one of said cycles causing the piston to move in said one direction and the gate to open simultaneously, the other of said cycles causing positioning of the driving unit preparatory to moving said piston in said one direction and the gate to close simultaneously.

5. A meat processing machine as set forth in claim 4, there being means operatively associated with said piston to disengage said driving unit therefrom when the piston has completed its path of travel in said one direction whereby said piston may be moved in said other direction.

6. A meat processing machine as set forth in claim 5, said means including a shiftable collar surrounding the cylinder of the piston and cylinder assembly; a pin carried by said collar for engaging the piston when the latter has completed its path of travel in said one direction; and a swingable member engageable by said collar when it is shifted in said one direction, the swinging of said member causing disengagement of said driving unit and said piston.

7. A meat-processing machine comprising:
a tube for receiving the meat;
a feeding assembly at one end of the tube for moving the meat through the tube and out the other end of the tube;
a gate at said other end of the tube for squeezing the meat as it moves out of said other end of the tube; and
a source of fluid under pressure for sequentially operating said machine in predetermined cycles whereby to move said meat through said tube in predetermined increments, one of said cycles concurrently causing movement of the meat through the tube a predetermined increment and opening of the gate, the other of said cycles concurrently causing shifting of the feeding assembly to a position preparatory to advancing the meat the next predetermined increment and closing of the gate.

8. A meat-processing machine comprising a tube for forming a piece of meat as it moves therethrough; a feeding assembly for moving a piece of meat through said tube, said feeding assembly including a piston and cylinder assembly, the piston having a shaft and a plate; a driving unit for moving said piston in one direction in predetermined increments, said driving unit including a shiftable rod, said rod having means at one end thereof for engagement with said piston; means for limiting the extent of movement of said rod in said one direction to the predetermined increments; and means for moving the piston in an opposite direction.

9. A meat-processing machine as set forth in claim 8, the shaft of said piston being toothed, said means for engaging the piston being in the form of a dog swingably carried at said one end of the rod and engageable with said teeth.

10. A meat-processing machine as set forth in claim 8, there being a sleeve surrounding said rod intermediate the ends thereof; and means for introducing fluid under pressure into said sleeve whereby to shift said rod.

11. A meat-processing machine as set forth in claim 10, said means for moving said piston in an opposite direction including a spring-loaded pulley and cable coupled to the end of said piston shaft opposite to the piston plate.

References Cited by the Examiner

UNITED STATES PATENTS

| 165,638 | 7/1875 | Weeks | 100—266 X |
| 234,983 | 11/1880 | Hoefjen | 100—232 X |
| 497,127 | 5/1893 | Matthews et al. | 17—38 |
| 988,347 | 4/1911 | Johnson | 100—13 |
| 2,587,826 | 3/1952 | Ferrier et al. | 74—169 |
| 2,730,286 | 1/1956 | Opie | 100—233 X |
| 2,749,837 | 6/1956 | Hayford et al. | 100—232 X |
| 2,977,732 | 4/1961 | Leonard et al. | 53—124 |
| 3,019,722 | 2/1962 | Gum | 100—1 |
| 3,082,682 | 3/1963 | Kaufman | 100—3 |
| 3,101,013 | 8/1963 | Ayers et al. | 74—128 X |

FOREIGN PATENTS 333,430   12/1958   Switzerland.

WALTER A. SCHEEL, *Primary Examiner.*